April 13, 1965 F. G. WILLIAMS, JR., ET AL 3,177,756
CUVETTE
Filed Feb. 15, 1960
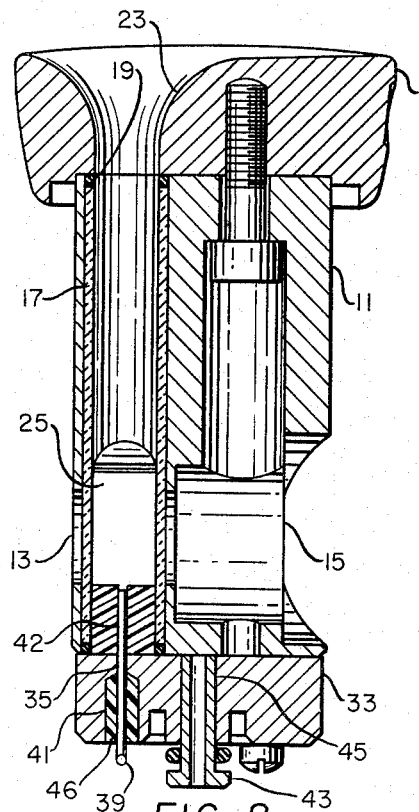
FIG. 2
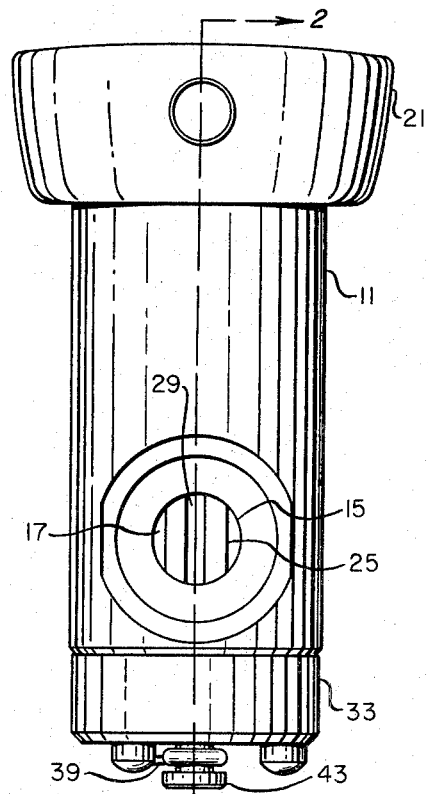
FIG. 1
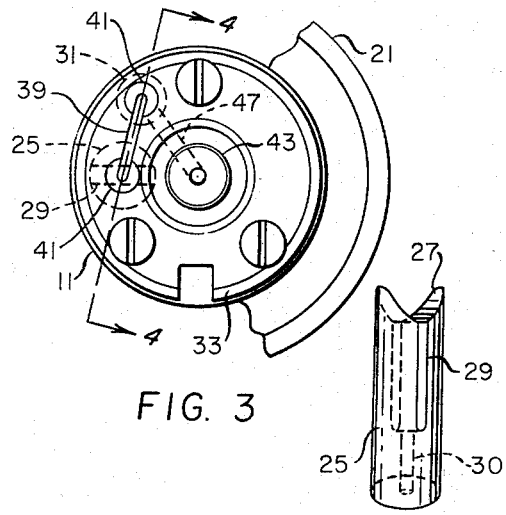
FIG. 3
FIG. 5
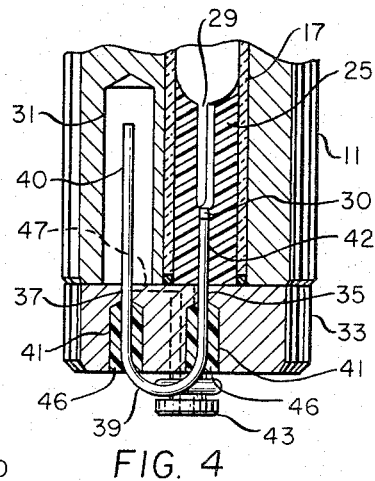
FIG. 4
INVENTORS
FRED G. WILLIAMS, JR.
ERNEST M. WHITLEY
BY FRANK I. FULLER
Flehr and Swain

United States Patent Office 3,177,756
Patented Apr. 13, 1965

3,177,756
CUVETTE
Fred G. Williams, Jr., Redwood City, Ernest M. Whitley, Palo Alto, and Frank I. Fuller, Menlo Park, Calif., assignors to Beckman Instruments, Inc., a corporation of California
Filed Feb. 15, 1960, Ser. No. 8,622
3 Claims. (Cl. 88—14)

This invention relates generally to a cuvette and more particularly for a cuvette for use as a sample holder for photometric analyzing apparatus.

In prior art photometric analyzing apparatus, samples to be analyzed are often placed in individual test tubes or other receptacles. The test tubes or receptacles are then individually placed in the apparatus for analysis. Variation in light transmission characteristics of the test tubes or receptacles introduce errors into the final determinations. Moreover, the process of individually removing and replacing the several sample holders is time consuming and in itself may lead to errors.

More recently cuvettes have been devised which depend on valving arrangements for selectively applying and removing a sample from a fixed cuvette. The cuvette retains the sample for a determination. When the determination is completed, the sample may be removed. Removal of the cuvette from its accompanying apparatus is not required to remove the sample.

This more recent type of cuvette eliminates the necessity of utilizing individual test tubes for holding the test samples. However, certain limitations are evident. The use of a valving arrangement for selectively removing the samples requires relatively high precision manufacturing with accompanying high costs. Moreover, the moving parts are continually subject to wear and, in time, may need replacing.

It is, therefore, a general object of the present invention to provide an improved cuvette for use as a sample holder for photometric analyzing apparatus.

It is another object of the present invention to provide a cuvette for use as a sample holder for photometric analyzing apparatus which employs a flat elongated plug opening to hold the sample, and through the bottom of which the sample may be removed, upon completion of analysis, by application of a vacuum in which no moving parts are utilized.

It is a further object of this invention to provide a sample holder of the above character which may be placed in the apparatus and calibrated and which then may be used to carry out a plurality of measurements without removing the same from the apparatus.

These and other objects of the invention will be more clearly apparent from the following description when read in conjunction with the accompanying drawing in which:

FIGURE 1 is a front elevational view of a cuvette in accordance with this invention for use in photometric analyzing apparatus;

FIGURE 2 is a partial section of the cuvette taken along the line 2—2 of FIGURE 1;

FIGURE 3 is a bottom view of the device shown in FIGURES 1 and 2;

FIGURE 4 is a sectional view taken along the lines 4—4 of FIGURE 3; and

FIGURE 5 is a perspective view of a plug used in the present invention.

Referring to FIGURES 1 to 4, a novel cuvette for use as a sample holder is illustrated in detail. The cuvette includes a body 11 which is generally cylindrical in shape and has diametrically opposed windows 13 and 15 at the lower end thereof. The windows permit the passage of light from a source (not shown) through a quantity of sample held within the body as will be described hereinafter, to a light sensitive apparatus (not shown) for measuring the intensity and characteristics of the light passed through the sample.

A tube 17, which may be of glass, is disposed within the body 11 and extends through the entire axial length thereof. A ring 19 may be employed at the upper edge to retain the same within the body. A cap 21 having a funnel-shaped opening 23 is mounted above the body 11 and retained by a screw or other convenient means. In mounting the cap, the funnel-shaped opening 23 is positioned in registry with the tube 17.

A plug 25 is disposed within the lower end of the tube 17 in air-tight slip-fit. The plug may be seen more clearly in FIGURE 5 as being generally cylindrical with a slot 29 cut longitudinally of the plug and extending longitudinally along a substantial portion of the plug. The upper end of the slot diverges outwardly 27 in the form of a V to funnel fluid into the slot. An opening 30 communicates between the bottom of the slot 29 and the bottom of the plug 25.

As seen particularly in FIGURES 1 and 2, the slot 29 of the plug 25 is arranged within the tube 17 such that its sides are parallel to the optical path between the windows 13 and 15.

Also within the body 11 is a chamber 31 which can be seen in FIGURES 3 and 4. The position of the chamber 31 is such that it is alongside the slot 29. Consequently, a light beam projected through the slot 29 is unobstructed.

A bottom disc 33 is secured below the body 11 by screws or other convenient means. The bottom disc includes a pair of through openings 35 and 37, one of which is in registry with the opening 30 in the plug 25, and the other of which is in registry with the chamber 31 in the body 11.

A U-shaped tube 39 having one leg 40 substantially longer than the other 42 is placed through the slots 35 and 37 with the shorter end 42 being located within the opening 30 in the plug 25. The longer end 40 is placed within the chamber 31 and is located as the desired liquid level in the cuvette may require.

The level of the liquid is selected to be above the windows 13 and 15. The liquid is placed through the tube 17 into the slot 29 disposed between the windows 13 and 15 for photometric analyses.

If it is desired to have liquid completely extend across the window 15 as shown in FIGURE 1, the longer end 40 of the tube will be located slightly higher than the upper edge of the window 15. Once the desired position of the tube 39 is obtained, it may be permanently fixed, such as by cement 46 in the counter bored holes 41.

A nipple 43 is located within an additional opening 45 of the bottom disc 33 and a groove 47 is provided to communicate between the nipple 43 and the chamber 31.

Operation of the apparatus is as follows: The sample holder is placed within a photometric analyzing apparatus and an opaque liquid is poured through the funnel portion 23 into the tube 17. The liquid within the tube 17 will seek a level as determined by the level of the U-shaped tube in the chamber 31, or if additional liquid is supplied through the funnel 23, the reservoir 31 will tend to become filled. At this point the apparatus may be adjusted for zero reading with the opaque liquid within the slot 29 at a height as determined by the level of the U-shaped tube 39 in the chamber 31. By applying suction at the nipple 43, the tube 17 and reservoir 31 may be emptied through the groove 47 and the nipple 43.

The cuvette may then be suitably washed by pouring detergent through the funnel 23 and repeating the operation hereinbefore described. Subsequently, the sample holder may be washed with acetone containing a small amount of alcohol or the like. Subsequent washing with pure water will leave the cuvette clean.

To complete the calibration of the apparatus, standard solutions are employed and the operation as described above with respect to the opaque liquid is repeated. After several standard solutions have been utilized, the calibration curve is obtained which may subsequently be employed to determine the readings of samples under test.

With the height of the tube 39 within the reservoir 31 preselected, a predetermined amount of fluid will be contained in the cuvette before overflow takes place. Consequently, a plurality of determinations can be made with various standards and samples. The only variable in each reading is that of the standard or sample itself. By subsequent application of a suction at the nipple 43, the fluid retained in the tube can be withdrawn into the chamber 31 and subsequently removed therefrom. It is noted that no valves or moving parts are necessary for retaining the fluid in the cuvette. Additionally, the holder is permanently aligned and there are no possible changes of optical paths as encountered when changing from one test tube to another. The apparatus is suitable for rapidly performing photometric analysis for a large number of successive samples. Moreover, because of the plug and slot, relatively small volumes of sample are required to provide suitable photometric characteristics.

We claim:

1. In a photometric analysis apparatus, an insertable cuvette comprising an upright cylindrical body defining a generally cylindrical opening extending axially therethrough, an elongated tube disposed in said opening, a plug disposed in the lower end of said tube, said plug defining a longitudinally extending slot therein, the lower end of said plug defining an opening in communication with said slot, a pair of windows in said body disposed on opposite sides of said slot whereby an optical path is defined between said windows and through said slot, said body further defining a chamber disposed out of alignment with said optical path and communicating with the bottom of said body, a disc secured to the bottom of said body, said disc defining a first opening therethrough in registry with the opening in said plug and a second opening therethrough in registry with said chamber, an open-ended U-shaped tube having one leg substantially longer than the other, the shorter leg of said U-shaped tube being disposed in the opening in said plug through the corresponding opening in said disc, the other leg of said U-shaped tube being extended through said second opening in the disc, the end of the other leg of said U-shaped tube being disposed in said chamber at a level at least even with a portion of the slot in said plug, said disc defining a third opening therethrough, said third opening being in communication with said chamber, and means for applying a vacuum to said third opening.

2. A photometric analyzing apparatus for analyzing a liquid sample comprising an elongated body provided with a generally cylindrical opening extending axially therethrough, an elongated tubular member snugly received in said cylindrical opening, said tubular member including means defining a longitudinally extending slot, the lower end of said slot terminating in a drain opening for drawing fluid out of the slot, a pair of windows in said body disposed on opposite sides of said slot to define an optical path between said windows and through said slot, means for retaining said tubular member in said body, a chamber formed in said body adjacent said tubular member, a U-shaped tube providing communication between said drain opening and said chamber, a passage communicating between the lower end of the chamber and the exterior of the body and providing the only other fluid communication with said chamber thereby providing a connection adapted to be coupled to a source of vacuum to withdraw fluid from the tubular member via the chamber.

3. In a photometric analysis apparatus an insertable cuvette comprising an upright cylindrical body defining a generally cylindrical opening extending axially therethrough, an elongated tubular member disposed in said opening, means defining, at the lower end of said tubular member, a longitudinally extending slot and a drain opening at the lower end of said slot in communication with said slot, a pair of windows in said body disposed on opposite sides of said slot whereby an optical path is defined between said windows and through said slot, said body further defining a chamber disposed out of alignment with said optical path and communicating with the bottom of said body, a bottom closure member secured to the bottom of said body, said bottom closure member defining a first opening therethrough in registry with the drain opening and a second opening therethrough in registry with said chamber, an open-ended U-shaped tube having one leg substantially longer than the other, the shorter leg of said U-shaped tube being disposed to extend through said first opening in said bottom closure member and into fluid communication with the drain opening of the slot, the other leg of said U-shaped tube being extended through said second opening in the bottom closure member, the end of said other leg of said U-shaped tube being disposed in said chamber at a level at least even with a portion of the slot, said bottom closure member defining a third opening therethrough, said third opening being in communication with said chamber, and means for applying a vacuum to said third opening.

References Cited by the Examiner

UNITED STATES PATENTS

| 1,931,968 | 10/33 | Sweeney et al. | |
|---|---|---|---|
| 1,960,615 | 5/34 | Baker | 88—14 |
| 2,090,041 | 8/37 | Gross. | |
| 2,333,791 | 11/43 | Hutchison. | |
| 2,630,735 | 3/53 | Rouy | 88—14 |
| 2,970,216 | 1/61 | Magrath | 88—14 |

FOREIGN PATENTS

| 724,121 | 8/42 | Germany. |
|---|---|---|
| 1,182,666 | 1/59 | France. |

JEWELL H. PEDERSEN, *Primary Examiner.*

WILLIAM MISIEK, EMIL G. ANDERSON, *Examiners.*